United States Patent [19]

Ribbens et al.

[11] Patent Number: 5,278,760

[45] Date of Patent: Jan. 11, 1994

[54] METHOD AND SYSTEM FOR DETECTING THE MISFIRE OF AN INTERNAL COMBUSTION ENGINE UTILIZING ENGINE TORQUE NONUNIFORMITY

[75] Inventors: William R. Ribbens, Ann Arbor, Mich.; Yuzo Kadomukai, Ibaraki, Japan; Giorgio Rizzoni, Worthington, Ohio

[73] Assignees: Hitachi America, Ltd., New York, N.Y.; Regents of the University of Michigan, Ann Arbor, Mich.

[21] Appl. No.: 759,397

[22] Filed: Sep. 13, 1991

Related U.S. Application Data

[63] Continuation-in-part of Ser. No. 741,338, Aug. 21, 1991, Pat. No. 5,239,473, and a continuation-in-part of Ser. No. 512,779, Apr. 20, 1990, Pat. No. 5,200,899.

[51] Int. Cl.$^5$ .............. G06F 15/50; G06F 15/48; F02P 5/14
[52] U.S. Cl. .............. 364/424.1; 364/431.01; 364/431.07; 123/425; 123/478; 123/436
[58] Field of Search .......... 364/424.1, 431.01, 431.07; 73/116, 112, 117.3; 123/478, 436, 425, 414; 44/414

[56] References Cited

U.S. PATENT DOCUMENTS

| | | | |
|---|---|---|---|
| 4,513,721 | 4/1985 | Ina et al. | 123/478 |
| 4,525,781 | 6/1985 | Konomi et al. | 364/431.01 |
| 4,532,592 | 7/1985 | Citron et al. | 364/431.05 |
| 4,550,595 | 11/1985 | Venema | 73/116 |
| 4,562,818 | 1/1986 | Kohama et al. | 123/478 |
| 4,583,991 | 4/1986 | Germane et al. | 44/414 |
| 4,697,561 | 10/1987 | Citron | 364/431.07 |
| 4,787,354 | 11/1988 | Wilens et al. | 123/414 |
| 4,843,870 | 7/1989 | Citron et al. | 364/431.07 |
| 4,919,099 | 4/1990 | Extance et al. | 123/425 |
| 5,044,195 | 9/1991 | James et al. | 73/117.3 |
| 5,156,128 | 10/1992 | Nakagawa | 123/436 |
| 5,200,899 | 4/1993 | Ribbens et al. | 364/431.08 |

*Primary Examiner*—Thomas G. Black
*Assistant Examiner*—Jacques H. Louis-Jacques
*Attorney, Agent, or Firm*—Brooks & Kushman

[57] ABSTRACT

An improved method and system are provided for the detection of internal combustion engine misfires utilizing optimum signal processing. The method and system exploit a measurement of engine crankshaft angular velocity in conjunction with hybrid electronic signal processing. Once the angular velocity signal is conditioned to minimize the effects of random error and external disturbances, four alternate computationally efficient methods may be used to extract information pertaining to individual cylinder torque productions. Two of the methods employ extremal samples of the estimated torque or velocity waveform to obtain a random torque nonuniformity index or metric. The other two methods utilize a transformation into the frequency domain after the input data is first sampled and windowed to substantially lower probability of error. All of the methods provide an M-dimensional torque nonuniformity vector of individual cylinder performance for each individual engine cycle. A reference level for the nonuniformity index is derived for any given cylinder in any given cycle. This yields misfire detection at a relatively early time and is particularly suitable for transient engine operation.

17 Claims, 8 Drawing Sheets

METHOD AND SYSTEM FOR DETECTING THE MISFIRE OF AN INTERNAL COMBUSTION ENGINE UTILIZING ENGINE TORQUE NONUNIFORMITY

CROSS-REFERENCE TO RELATED APPLICATION

This application is a continuation-in-part application of copending patent applications having a common title, Ser. No. 512,779, filed Apr. 20, 1990, and now U.S. Pat. No. 5,200,899, and Ser. No. 741,338, filed Aug. 21, 1991 and now U.S. Pat. No. 5,239,473. The copending applications are hereby expressly incorporated by reference.

1. Technical Field

This invention relates to methods and systems for detecting the misfire of an internal combustion engine and, in particular, to method and system for detecting the misfire of an internal combustion engine utilizing engine torque nonuniformity.

2. Background Art

In recent years, automotive exhaust emission control system performance has become an important issue across the U.S. Virtually all cars sold in the U.S. from the early 1980's have been equipped with a three-way catalytic converter in the exhaust system. In order for this catalytic converter to function correctly, the vehicle is also typically equipped with a fuel control system which maintains a stoichiometric mixture (i.e. Air mass/fuel mass=14.7).

The long-term performance of automotive exhaust emission control systems is strongly influenced by the physical condition of the catalytic converter. Unfortunately, the catalytic converter is susceptible to irreversible damage from any number of factors.

One of the most likely causes of catalyst degradation is the occurrence of engine misfire. Misfire is a condition in which combustion does not occur in one or more engine cycles in one or more cylinders due, for example, to absence of ignition, or misfueling. Under engine misfire conditions, unburned fuel and air are pumped into the catalyst, greatly increasing its operating temperature. This problem is usually most severe under high load, high speed engine operating conditions, where even a few seconds of misfire can cause catalyst temperatures to soar above 900° C. (1650° F.), causing irreversible damage to the catalyst. Even today's most advanced catalysts generally are unable to sustain continuous operation above 900° C. without damage.

Vehicle operation while misfire is present also contributes to excess emissions, especially when the misfire is present during engine warmup and the catalyst has not reached operating temperature. Obviously, misfire is also undesirable because the engine produces reduced or no torque during the misfiring cycle.

The integrity of the exhaust emission system can best be maintained by monitoring its performance continuously on board the vehicle. It is with the intent of monitoring emission system performance that the California Air Resources Board in 1989 passed regulations which will require all new vehicles after 1994 to be equipped with on-board monitoring systems capable of detecting misfires. These proposed regulations are known as OBDII and may be followed by similar Federal EPA regulations. The proposed regulations are applicable for any misfire condition (e.g. random, continuous, equally spaced, etc.) for the purpose of identifying a malfunction.

There are a variety of methods and systems for detecting misfire. These include the use of crankshaft angular velocity fluctuation, observing the change in oxygen sensor waveform pattern, enhancing the present knock sensor concept to "listen" for the absence of combustion, installation of cylinder pressure transducers, analysis of secondary ignition waveform pattern, use of temperature sensors to detect catalyst temperature during misfire, and others.

The prior art discloses many methods of detecting misfire based upon measurements of torque as derived from noncontacting crankshaft angular velocity measurements. The misfire condition is detected from these torque measurements. These methods of torque measurement are well known. However, each of these methods has certain deficiencies with respect to cost effective, reliable misfire detection as required by the OBDII regulations.

For example, each of U.S. Pat. Nos. 4,843,870, 4,697,561 and 4,532,592 disclose a method of measuring engine torque utilizing digital techniques to sample crankshaft angular velocity. The time between successive fixed angular positions on the crankshaft is measured using a high frequency clock. One sample of crankshaft angular velocity $\omega_i$ is obtained by the relation:

$$\omega_i = \frac{\theta_i - \theta_{i-1}}{\Delta t_i}$$

where $\theta_i$ and $\theta_{i-1}$ are the crankshaft angular positions.

$\Delta t_i$ = time interval.

One of the problems of this digital measurement of angular velocity is the random (or pseudorandom) errors involved. There are two error sources for the digital method: 1) the random variations in measurement of angular position and 2) the timing errors involved in measuring $\Delta t_i$. The first error source results from runout of the crankshaft gear and by variations in the magnetic coupling of the sensor to the crankshaft gear. In order to be practical for torque measurements, these angular velocity measurements must be filtered by means of a digital filter.

Thus the digital measurement of crankshaft angular velocity has the disadvantage of requiring electronic complexity simply to obtain a measurement (with minimum random error) of crankshaft angular velocity. In addition, this digital method has a limited sampling rate which is influenced by the angular separation $\Delta\theta$ ($\Delta\theta = \theta_i - \theta_{1-i}$). The clock frequency must be extremely high to have an adequate number of counts to achieve the desired sampling rate and achieve the accuracy required to measure $\Delta\theta$. The accuracy of determining $\theta_i$ and $\Delta t_i$ decreases with increasing RPM.

Another deficiency in the digital method is the rather cumbersome method of dealing with engine dynamics. It has long been recognized that calculation of torque from crankshaft angular velocity measurements requires a correction for the forces associated with reciprocating components (i.e. piston, connecting rod). This is illustrated in the reference A. Rizzoni, "A Model for the Dynamics of the Internal Combustion Engine", PhD dissertation, Department of Electrical and Computer Engineering, University of Michigan, Ann Arbor, Mich., February 1986.

Still another deficiency in the references pertaining to torque nonuniformity measurements relative to misfire detection is the lack of any recognition that an index of torque nonuniformity is a random variable. There is no mention of the random nature of engine combustion, leading to randomness in engine torque production, in the prior art references except for those published by the present inventors.

For example, U.S. Pat. No. 4,550,595 discloses an analog circuit-based method of continuously estimating the instantaneous indicated torque of a four cylinder, two stroke/cycle reciprocating internal combustion engine. This patent teaches a method of calculating this torque based upon noncontacting continuous time measurements of crankshaft angular velocity. An exact calculation which accounts for the influence of the inertial forces associated with the reciprocating components on the crankshaft angular dynamics is also taught. There is no suggestion of using the measured torque for any cylinder by cylinder performance measurement and there is no hint of misfire monitoring.

U.S. Pat. No. 3,789,816 discloses a closed loop fuel control system for gasoline fueled reciprocating internal combustion engines. The control system incorporates instrumentation for measuring "engine roughness" (i.e. cylinder to cylinder and cycle to cycle torque imbalance). The roughness signal is obtained by electronic signal processing of crankshaft angular velocity measurements. The electronic signal processing does not account for reciprocating inertia forces.

U.S. Pat. No. 4,292,670 discloses a method for measuring the power and/or compression balance for a diesel engine. The method uses a noncontacting sensor to obtain a signal from the starter ring gear. Using a digital method, estimates are obtained of crankshaft angular velocity with a very limited sampling rate. The angular velocity measurements are then used as a means of estimating the work done by the engine during power stroke without compensating for reciprocating inertial forces in the engine dynamics.

U.S. Pat. No. 4,197,767 discloses a method of fuel control for a gasoline fueled IC engine during warm-up period. A method of measuring "engine roughness" is provided. This method incorporates a noncontacting sensor for measuring crankshaft angular velocity. Electronic signal processing generates a signal which is indicative of engine roughness. However, there is no teaching of reciprocating inertia compensation. Furthermore, there is no hint of any relationship between the engine roughness signal and actual engine misfire.

SUMMARY OF THE INVENTION

An object of the present invention is to provide an improved method and system for detecting engine misfires in real time in a reliable and cost effective fashion during transient engine operation.

Another object of the present invention is to provide an improved method and system for detecting engine misfires in real time either for continuous or intermittent misfires whether the engine operation is steady or accelerating or decelerating.

In carrying out the above objects and other objects of the present invention, a method is provided for detecting the misfire of a reciprocating internal combustion engine having a plurality of reciprocating components, at least one cylinder and a crankshaft. The method includes the steps of measuring the angular velocity of the crankshaft to obtain an electrical signal representation thereof and filtering the electrical signal to minimize the effects of random error and disturbances in the electrical signal to obtain a filtered angular velocity signal. An M-dimensional torque nonuniformity vector derived from the filtered angular velocity signal is then calculated. At least one reference value of torque based on the torque nonuniformity vector is computed. Indicated torque provided by the at least one cylinder during a given engine cycle based upon the crankshaft angular velocity is estimated. Finally, the at least one reference value is compared with the indicated torque to obtain a misfire signal.

In one embodiment, the step of computing the at least one reference value includes the step of computing a weighted average of the torque of the at least one cylinder. Alternatively, or in addition to this step, the step of computing the at least one reference value includes the step of computing an arithmetic average of the torque of the at least one cylinder.

Preferably, the internal combustion engine has a plurality of cylinders and wherein the step of computing the at least one reference value includes the step of computing a weighted average of the torque for the plurality of cylinders. Alternatively, or in addition to this step, the step of computing the at least one reference value includes the step of computing the arithmetic average of the torque for the plurality of cylinders.

Also provided is a system for carrying out each of the method steps.

The objects, features and advantages of the present invention are readily apparent from the following detailed description of the best mode for carrying out the invention when taken in connection with the accompanying drawings.

BRIEF DESCRIPTION OF THE BEST MODE

Figure 1:
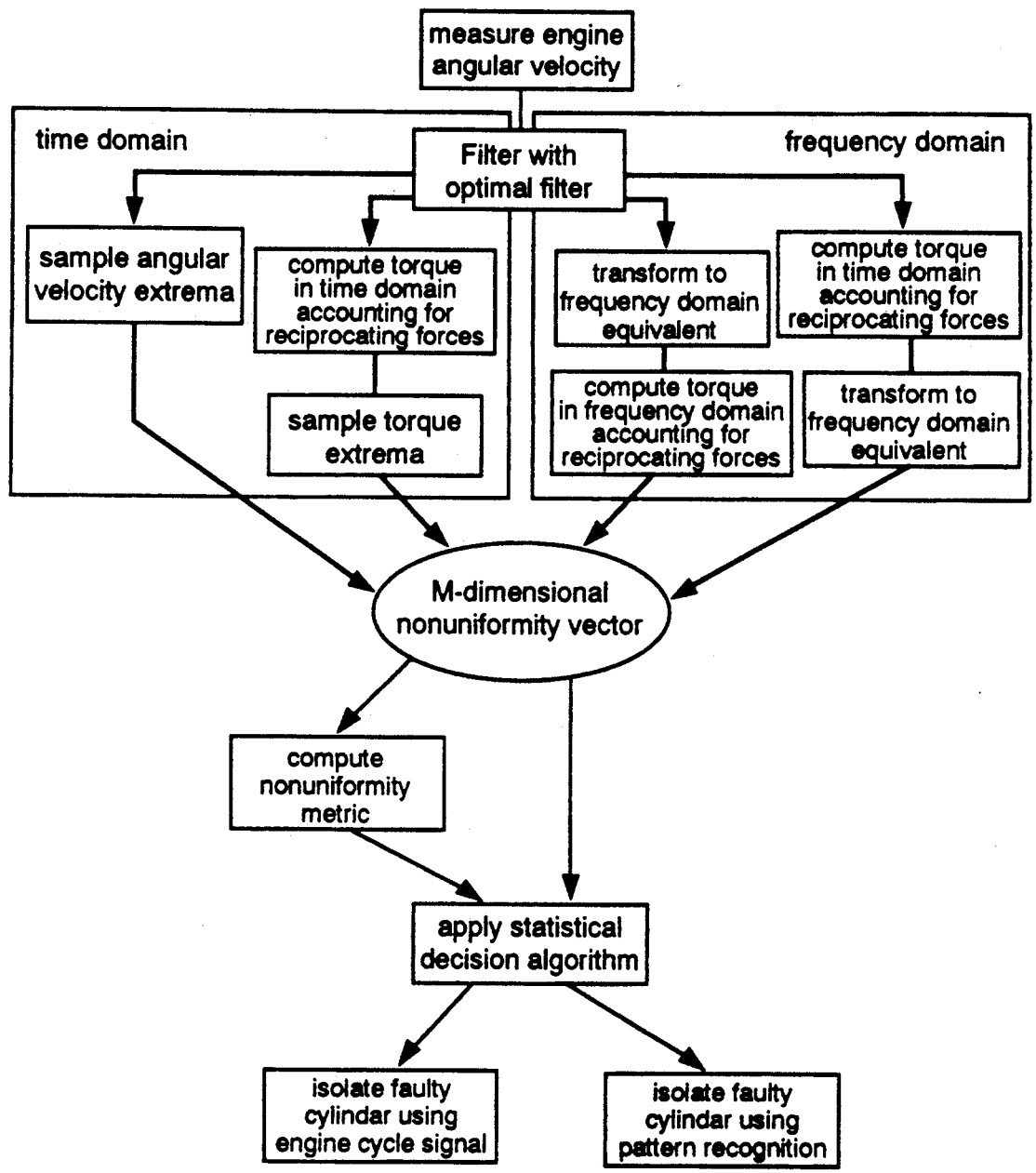
FIG. 1 is a block diagram of the method of the present invention.
Figure 2:
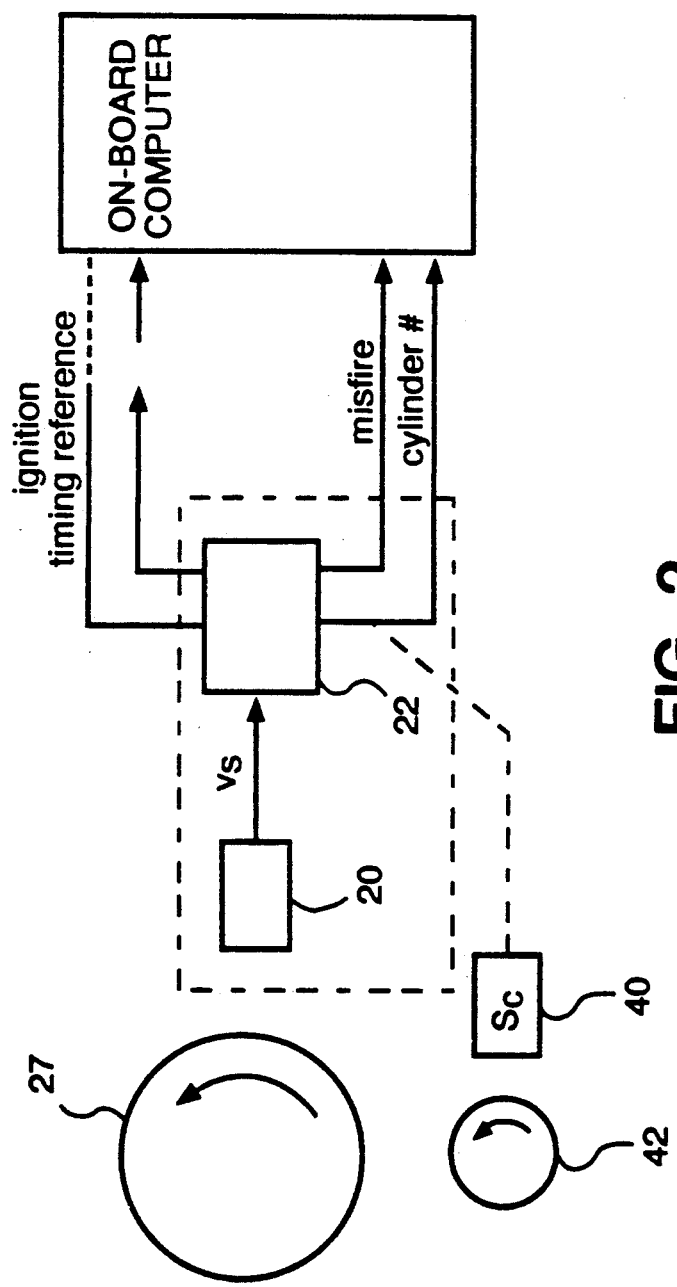
FIG. 2 is a block diagram of the system of the present invention.

Referring now to the drawing figures, there are illustrated in FIGS. 1 and 2 the method and system for detecting the misfire of a reciprocating IC engine utilizing angular velocity fluctuations. As indicated in FIG. 1, four possible methods are provided for such detection.

Figure 3:
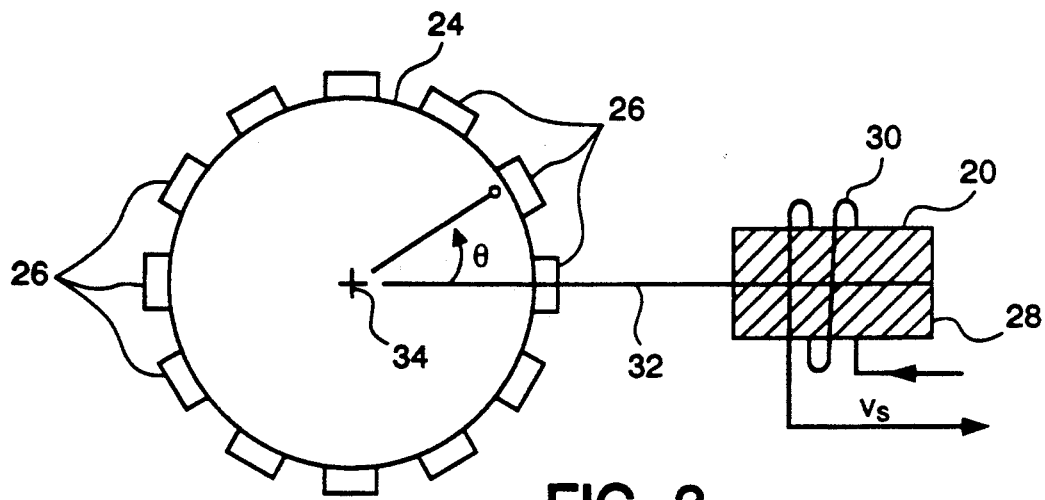
FIG. 3 is a schematic diagram of a crankshaft position sensor for use in the present invention.

FIGS. 2 and 3 illustrate a crankshaft position sensor, generally indicated at 20, which generates an output signal, $V_s$, which is the primary input to an electronic signal processing unit, generally indicated at 22. A variety of sensor configurations are potentially possible including magnetic induction, Hall effect, optical, etc.

In the embodiment of FIG. 3, a ferromagnetic disk, generally indicated at 24, with M uniformly spaced lugs 26 is coupled magnetically to the sensor 20. The disk 24 is mounted for rotation with a crankshaft 27 of an internal combustion engine.

In this embodiment of the sensor 20, the sensor 20 includes a permanent magnet 28 around which a coil 30 is wound. The magnetic flux linkage varies periodically with crankshaft angle $\theta$ because the magnetic coupling varies with spacing between the sensor 20 and the disk 24. This spacing is smallest whenever any lug 26 is symmetrically positioned along the center line ($C_L$) 32 of the crankshaft axis 34 and coil axis as shown. The magnetic flux linkage for the coil 30 is smallest whenever any pair of lugs 26 are symmetrically positioned relative to the center line 32. The angular period of the periodic flux linkage is $2\pi/M$ radians (or $360°/M$ degrees) where M is the number of lugs 26 on the disk 24.

As the crankshaft 27 rotates about its axis 34, the sensor 20 generates an output voltage $v_s(t)$ in accordance with Faraday's law. The instantaneous frequency of the sensor voltage, $\omega_s(t)$ is related to the instantaneous crankshaft angular frequency $\omega_e(t)$ by:

$$\omega_s(t) = M\, \omega_e(t) \text{ (ideal model)}$$

$$\omega_s(t) = M\, \omega_e(t) + y(t) \text{ (practical model)}$$

The practical model contains a term $y(t)$ which is a pseudo-random process associated with imperfections in the uniformity of the coupling of the sensor to the lugs 26 on the disk 24.

There are two distinct methods of obtaining the measurement of crankshaft angular velocity from the sensor output: 1) analog, and 2) digital. In one digital method, the time interval between successive zero crossings at the sensor voltage $\tau_i$ is measured. For each such measurement, an estimate $\omega_i$ of angular speed is obtained.

$$\omega_i = \frac{2\pi}{\tau_i} \quad \text{ideal relationship}$$

$$\omega_i = \frac{2\pi + \delta\theta_i}{\tau_i + \delta\tau_i} \quad \text{practical model}$$

In the practical model, errors $\delta\theta_i$ and $\delta\tau_i$ occur due respectively to:

$\delta\theta_i =$ errors due to runout and imperfections in uniformity of lug spacing $\delta\tau_i =$ time interval errors In the digital method, there are three error sources in each estimate of $\omega_i$. The timing errors associated with measuring $\tau_i$, the errors in $\delta\theta_i$ due to imperfections in tooth to tooth spacing and/or magnetic coupling and the errors in $\delta\theta_i$ due to runout can be reduced by digital filtering of $\omega_i$. However, the runout error generates an error signal the spectrum of which overlaps the spectrum of the engine angular velocity signal during misfires and, in general, cannot be separated from measurements of $\omega_i$.

Figure 4:
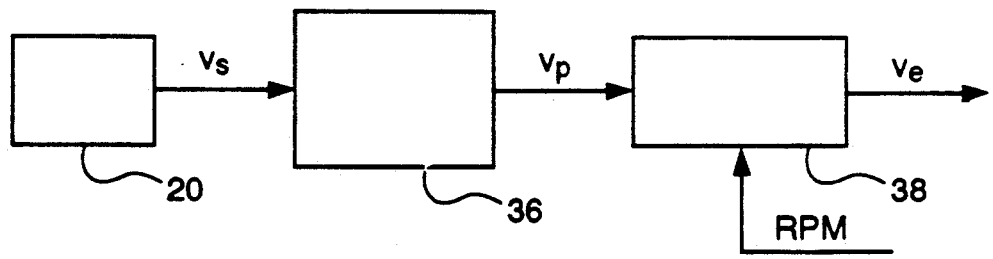
FIG. 4 is a block diagram of a part of the system for obtaining an analog voltage which is proportional to the angular velocity of the crankshaft.
Figure 5A:
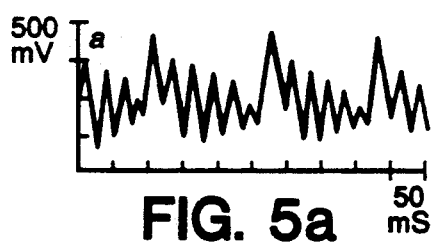
FIGS. 5A through 5D are graphs illustrating angular velocity waveforms associated with various types of misfire conditions.
Figure 5B:
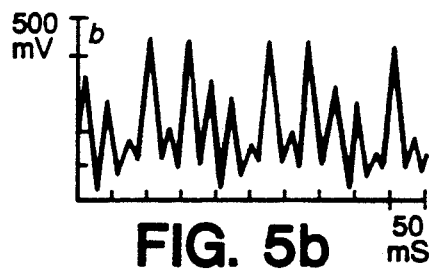
Figure 5C:
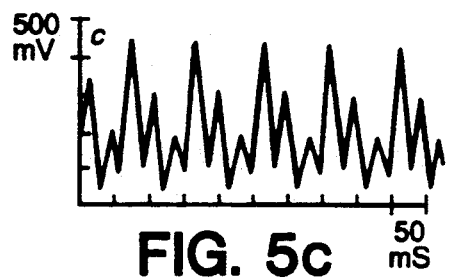
Figure 5D:
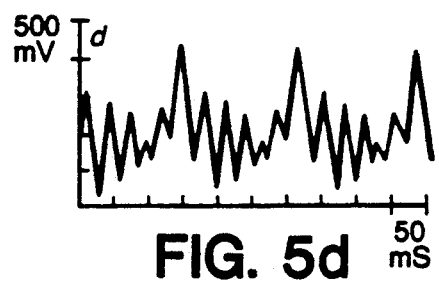

The analog method of the present invention is preferred and is illustrated in FIG. 4. The method uses an analog frequency to analog converter 36 along with a variable band pass filter 38 to obtain an analog voltage which is proportional to $\omega_i$.

The variable filter 38 is a band pass filter whose pass band frequencies are adjusted in accordance with crankshaft average angular speed (i.e. RPM), so that the filter selectively remains constant with varying engine speeds. This engine speed-dependent filtering is important to the effectiveness of the misfire detection method of the present invention, as it effectively provides a signal to noise ratio which is constant at all engine speeds, and an effective signal bandwidth which is constant at all engine speeds. One of the common drawbacks of other proposed methods is the inability to perform accurate detections at high speeds. The method discussed here does not suffer such limitations, because as engine speed is increased, little additional noise is introduced even though it is recognized that at high engine speeds camshaft and accessory loading add complexity to the dynamic motion of the crankshaft. However, one of the strengths of the frequency domain approach taught herein with respect to two embodiments of the present invention is the ability to separate the frequency domain component of crankshaft speed at the firing frequency (which is due to the combustion event) from such interrerence events as those described above, thereby facilitating the detection of misfires at all engine speeds.

The same is also accomplished in the time domain approach, also taught herein. Due to the optimal filtering algorithm, which eliminates the higher harmonics of the angular speed signal uniformly at all engine speeds, and owing to the fact that the misfire process generates energy only at subharmonics of the engine firing frequency, the time domain approach also achieves good detection of misfires in the presence of additional vibrations induced by such factors as camshaft loading or driveline road-induced excitation.

Another advantage of the present invention is the ability to distinguish individual misfiring cylinder (s). This is accomplished by means of a so-called engine cycle signal. This signal is generated once for each engine cycle (i.e. once for each two revolutions for a four-stroke/cycle engine and once per revolution for a two-stroke/cycle engine). Typically, such a signal is generated by a sensor 40 which is activated by a specific point on the engine camshaft 42, as illustrated in FIG. 2. For example, a magnetic sensor can be positioned close to a lug on the camshaft. A voltage pulse is generated each time this lug rotates past the sensor axis.

Overview

The successful implementation of the misfire detection method of three of the embodiments of the present invention requires algorithms which are capable of estimating the relative torque produced by each engine cylinder from the measured engine angular velocity; the fourth embodiment uses the angular velocity waveform directly. Two of the embodiments consist of sampling the extrema of either the angular velocity or of the engine torque waveform to obtain an M-dimensional nonuniformity vector, and are implemented in the time domain; the remaining two embodiments require converting either the angular velocity waveform or the engine torque waveform into the frequency domain by means of a frequency domain transformation, to obtain an M-dimensional nonuniformity vector. The following sections describe the principles underlying both the time domain and the frequency domain methods. An M-dimensional vector of engine torque nonuniformity can be obtained by any of the above mentioned embodiments, permitting the identification of engine misfires on a cylinder-by-cylinder and cycle-by-cycle basis.

Method 1: Time Domain

This section describes the preferred algorithm for the computation of an M-dimensional nonuniformity vector, consisting of either the extrema of the engine torque or the extrema of the engine angular velocity waveform, based on the measurement of crankshaft angular velocity. Experiments have demonstrated that the extrema of the engine torque waveform permit in general better identification of engine misfires; thus, the discussion will focus on the computation of the extrema of the torque waveform. In some circumstances, however, the extrema of the angular velocity waveform can also be effectively employed for misfire detection.

As illustrated in the reference G. Rizzoni, "A Model For The Dynamics Of The Internal Combustion Engine," Ph.D. dissertation, Department of Electrical and Computer Engineering, University of Michigan, Ann Arbor, February 1986, in order to compute the torque waveform from the angular velocity waveform, one needs to account for the dynamics of the engine rotating assembly, and for the effects of the reciprocating motion of the piston/connecting rod assembly. The principle underlying the method for reconstructing engine torque from angular velocity is based on the notion that the torque accelerating the crankshaft, and therefore causing the measured fluctuations in the angular velocity, is due to the superposition of two effects: i) combustion generated forces; and ii) reciprocating forces. Thus, the net engine torque accelerating the crankshaft 27, $T_e(\theta)$ may be expressed as a function of the crank angle, $\theta$, as follows:

$$T_e(\theta) = T_i(\theta) + T_r(\theta)$$

where $T_i(\theta)$ is the indicated torque, generated by the combustion forces, and $T_r(\theta)$ is the reciprocating inertia torque, generated by the reciprocating forces. The net engine torque, $T_e(\theta)$, accelerates the crankshaft 27, causing oscillations in the instantaneous engine angular velocity, $\omega(\theta)$; thus, the angular velocity waveform is itself composed of three components: the first consists of the velocity fluctuations which occur as a consequence of the combustion process, the second is due to the unavoidable reciprocating inertia torque due to the geometry of the crank-slider mechanism, which couples the combustion produced forces to the crankshaft; the third is due to the superposition of any other forces exciting an oscillation of the crankshaft 27 about its axis 34, including resonances, road-induced vibration, and accessory loads. The net effect of all these components is viewed as consisting of essentially random noise. The following expression illustrates the subdivision:

$$\omega(\theta) = \omega_i(\theta) + \omega_r(\theta) + \epsilon_N(\theta)$$

As noted in the above-noted reference in the name of G. Rizzoni, an estimate of the engine indicated torque, $T_i(\theta)$, may be obtained from a measurement of engine angular velocity, $\omega(\theta)$, by first considering the dynamics of the rotating assembly, consisting of the crankshaft, flywheel, harmonic damper, transmission and driveline, herein indicated by the impulse response of the rotating assembly, $h(\theta)$, is given by the convolution of the net engine torque, $T_e(\theta)$ with the impulse response of the engine rotating assembly:

$$\omega(\theta) = T_e(\theta) * h(\theta)$$

The above-noted reference teaches how to invert the above relationship in order to obtain $T_e(\theta)$ from a measurement of $\omega(\theta)$ once the engine torque, $T_e(\theta)$ is known, the indicated torque, produced by the combustion forces, may be obtained by subtracting $T_r(\theta)$ from $T_e(\theta)$:

$$T_i(\theta) = T_e(\theta) - T_r(\theta)$$

The reciprocating inertia torque correction term amounts to the product of a known function of crank angle, $f(\theta)$, times the equivalent mass of the reciprocating parts, times the square of the average engine speed. The function $f(\theta)$ is determined by the geometry of the reciprocating assembly, and can be precomputed for any given engine class. An approximate expression for the reciprocating inertia torque is given by the equation below for a four cylinder in-line engine configuration; corresponding expression may be obtained for six and eight cylinder engines in various configurations. The approximation below is adequate for estimating the indicated torque using the expression given above:

$$T_r(\theta) = M_{eq}\omega^2 R^2 \left( \cos\theta + \frac{R}{2L} \cos 2\theta \right)\left( \sin\theta + \frac{R}{2L} \sin 2\theta \right)$$
$$= \omega^2 f(\theta)$$

where R is the crank throw, $\omega$ the average engine RPM, L the connecting rod length, $\theta$ the crank angle, and $M_{eq}$ the equivalent mass of the reciprocating parts. The values of the function $f(\theta)$ may be pre-computed and stored in a table for use by the processor in computing the reciprocating inertia torque at any given engine speed.

The estimate of indicated torque obtained by the procedure outline above forms the basis of the misfire detection method disclosed herein. Since $T_i(\theta)$ is directly related to the combustion forces, knowledge of the instantaneous $T_i(\theta)$ waveform permits a determination of whether a normal or abnormal combustion occurred, and therefore the detection of engine misfire. It must however be remarked that due to the presence of a random component $\epsilon_N(\theta)$ in the measured speed waveform, the estimate of indicated torque is computed by random error. One aim of the present invention is to minimize the effects of such random error by employing statistical decision theory, as shown in a later section.

Figure 6:
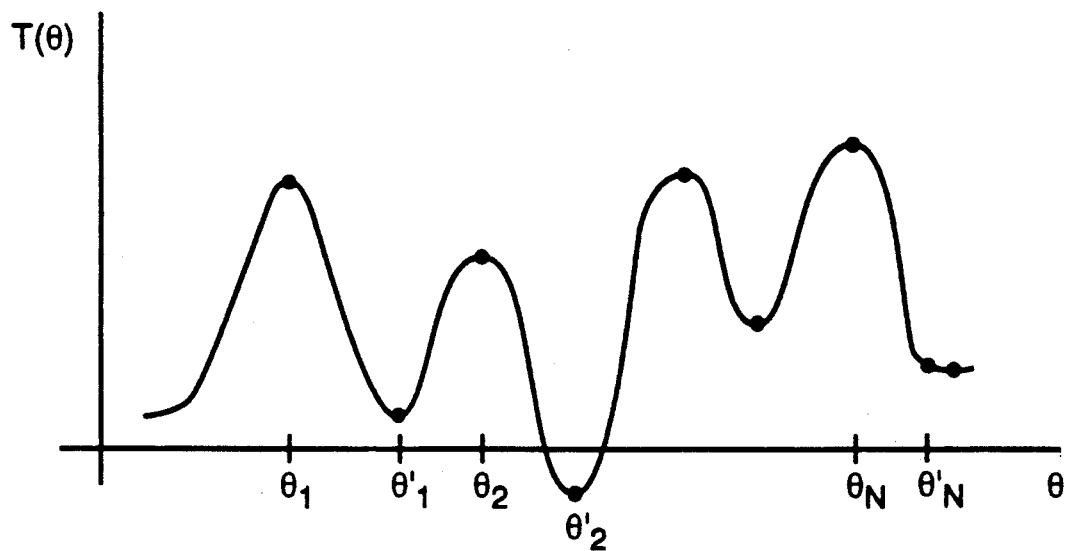
FIG. 6 is a graph of a torque waveform with samples of its extremal values.
Figure 7:
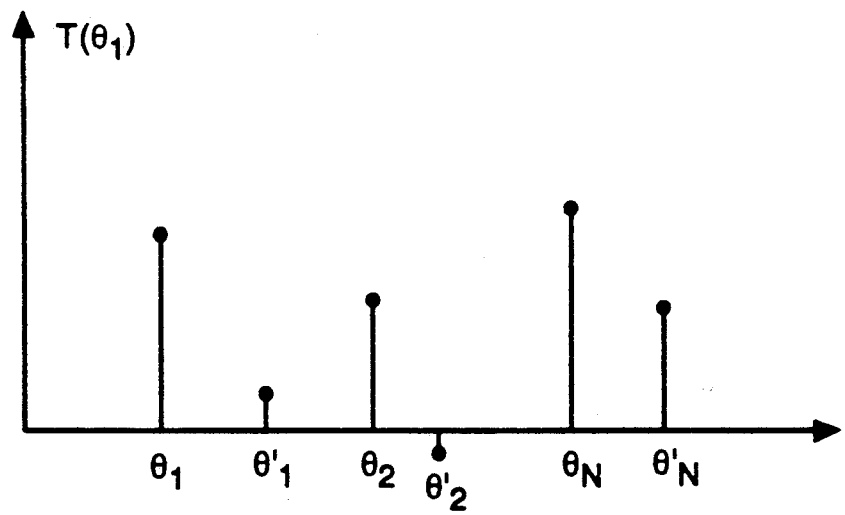
FIG. 7 is a graph of typical torque vector data.

The torque nonuniformity measurement is derived from samples of the extremal values of the torque waveform as illustrated in FIG. 6. Whereas, FIG. 7 illustrates typical torque vector data.

In FIG. 6, the torque $T_i(\theta)$ is represented as a function of crankshaft angle $\theta$. Each cycle represents the torque generated by a particular cylinder. By sampling $T_i(\theta)$ at the extremal values, the essential features of the nonuniformity are maintained. This is true because the shape of the torque waveforms between combustion events is determined by the combustion pressure as a function of crank angle and by the crankslider geometry of the engine. The crankshaft angles and associated torques at the extremal values are denoted:

$\theta_n$ = crankshaft angle for relative maximum
associated with cylinder n $\theta^n$ = crankshaft angle for relative minimum
associated with cylinder n $T_n = T_i(\theta_n)$
$T^n = T_i(\theta^n)$   $n = 1, 2, \ldots N$ These values are obtained for each engine cycle and an M-dimensional vector is computed, where M=2N in the preferred embodiment and where the superscript $T$ denotes the transpose of the vector.

$T^T = [T_1, T^1, \ldots T_n, T^n]$.

The average value for the 2N components $T_{av}$ is then found.

$$T_{av} = \frac{1}{2N} \sum_{n=1}^{N} (T_n + T^n)$$

The a 2N-dimensional vector representing torque nonuniformity is computed.

$n = T - T_{av} u$.

where $u^T = [1, -1, 1, -1, \ldots]$ is a 2N dimensional vector.

An M-dimensional vector of torque extrema (wherein M equals 2N in this embodiment and N represents the number of cylinders), $n = T - T_{av} u$ may be used to isolate the cylinder(s) responsible for the misfiring condition very effectively, as will be explained shortly.

Method 2: Frequency Domain

This section describes the preferred algorithm for the computation of a M-dimensional nonuniformity vector, consisting of the spectral content of the relative indicated torque produced by each cylinder during each cycle. Two embodiments are possible, according to the flow diagram of FIG. 1: the first transforms the time domain indicated torque waveform, computed as illustrated in the preceding section, into a frequency domain equivalent using a frequency domain transformation. The second embodiment directly applies a frequency domain transformation to the measured angular velocity waveform, and then computes the indicated torque produced by each cylinder in the frequency domain, as will be explained shortly. The result of either method is an M-dimensional torque non-uniformity vector which can be employed in a statistical decision algorithm for misfire detection. The frequency domain method may be even more effective in recovering the individual cylinder torque information, leading to the detection of misfires.

Let $\lambda$ represent angular frequency (which is canonically conjugate to crank angle) and let F represent a crank angle to angular frequency domain transformation, such as for example the Discrete Fourier Transform (DFT) performed on a number of samples of the analog velocity waveforms. The notation which shall be employed is the following:

$F\{\omega(\theta_n)\}56 = \Omega(\lambda)$ where $\omega(\theta_n)$ is a sampled version of the analog angular velocity waveform, sample at $\theta = \theta_n$.

As illustrated in the above-noted reference by G. Rizzoni, the relationship expressed earlier between engine torque and engine angular velocity, and repeated below for convenience $\omega(\theta) = T_e(\theta) * h(\theta)$ can also be expressed in the frequency domain, by the well known convolution property of linear systems, according to the expression:

$\Omega(\lambda) = T_e(\lambda) H(\lambda)$ where $H(\lambda)$ is the frequency response of the engine rotating dynamics, and can be measured experimentally for a given engine class. Based on this relationship, the frequency domain engine torque $T_e(\lambda)$ can be computed by the expression $T_e(\lambda) = \Omega(\lambda) H^{-1}(\lambda)$.

The frequency domain indicated torque can therefore be computed according to the expression $T_i(\lambda) = T_e(\lambda) - T_r(\lambda)$ where $T_r(\lambda)$ is obtained by a frequency domain transformation of the time domain reciprocating inertia torque $T_r(\theta)$:

$T_r(\lambda) = F(T_r(\theta))$.

The spectra of $\omega(\theta)$ and of $T_i(\theta)$, $\Omega(\lambda)$ and $T_i(\lambda)$, respectively, can be computed exactly by means of a frequency domain transformation (e.g., a DFT) because of the periodic nature of the rotation of the engine and of the combustion forces as a function of crank angle, $\theta$. Furthermore, as illustrated in the above-noted reference by G. Rizzoni, most of the energy in the combustion process is concentrated at the engine firing frequency, hereafter denoted by $\lambda_f$. Therefore, the computation of the indicated torque for each cylinder is greatly simplified in the frequency domain if performed at the single frequency $\lambda_f$.

$$T_i(\lambda_f) = T_e(\lambda_f) - T_r(\lambda_f)$$
$$= \Omega(\lambda_f)H^{-1}(\lambda_f) - T_r(\lambda_f)$$

Thus, the recovery of the indicated torque produced by each cylinder at the firing frequency can be accomplished by computing a frequency domain transformation (e.g., a DFT) of the angular velocity waveform sampled at discrete crank angles, $\theta_n$, where the sampling occurs synchronously with crank angle position, where the frequency domain transformation is computed only at the frequency $\lambda_f$, followed by multiplication by the inverse of the frequency response of the engine rotating assembly evaluated at $\lambda_f$, and by a correction for the frequency domain reciprocating inertia torque, also evaluated at $\lambda_f$. It is a distinct advantage of this method to only require the computation of a single frequency component of $\omega(\theta)$, and the storage in a table of a single frequency component of $T_r(\theta)$. In this case, $M=N$, where N is the number of cylinders. It is, however, possible to accomplish the same end by considering a plurality of frequency components, consisting of harmonics and subharmonics of the engine firing frequency, $\lambda_f$, if so desired. In this latter case, M is an integer multiple of N, determined by the number of frequency components employed in representing the indicated torque for each cylinder.

A further embodiment of the present method consists of transforming the indicated torque computed according to the time domain method described in the preceding section, and described by the expression $$T_i(\theta) = T_e(\theta) - T_r(\theta)$$

into a frequency domain equivalent, $T_i(\lambda)$, by means of a frequency domain transformation, after having sampled the indicated torque waveform $T_i(\theta)$ at discrete crank angle intervals, $\theta_n$, to obtain a discrete indicated torque sequence $T_i(\theta_n)$. The resulting frequency domain indicated torque, $T_i(\lambda)$, also gives rise to an M-dimensional vector of torque nonuniformity as described above.

The values of indicated torque computed by each of the above embodiments for each engine cylinder form an M-dimensional vector of torque nonuniformity, which can be used in a statistical decision algorithm for detecting engine misfire, as explained in the next section.

Figure 9:
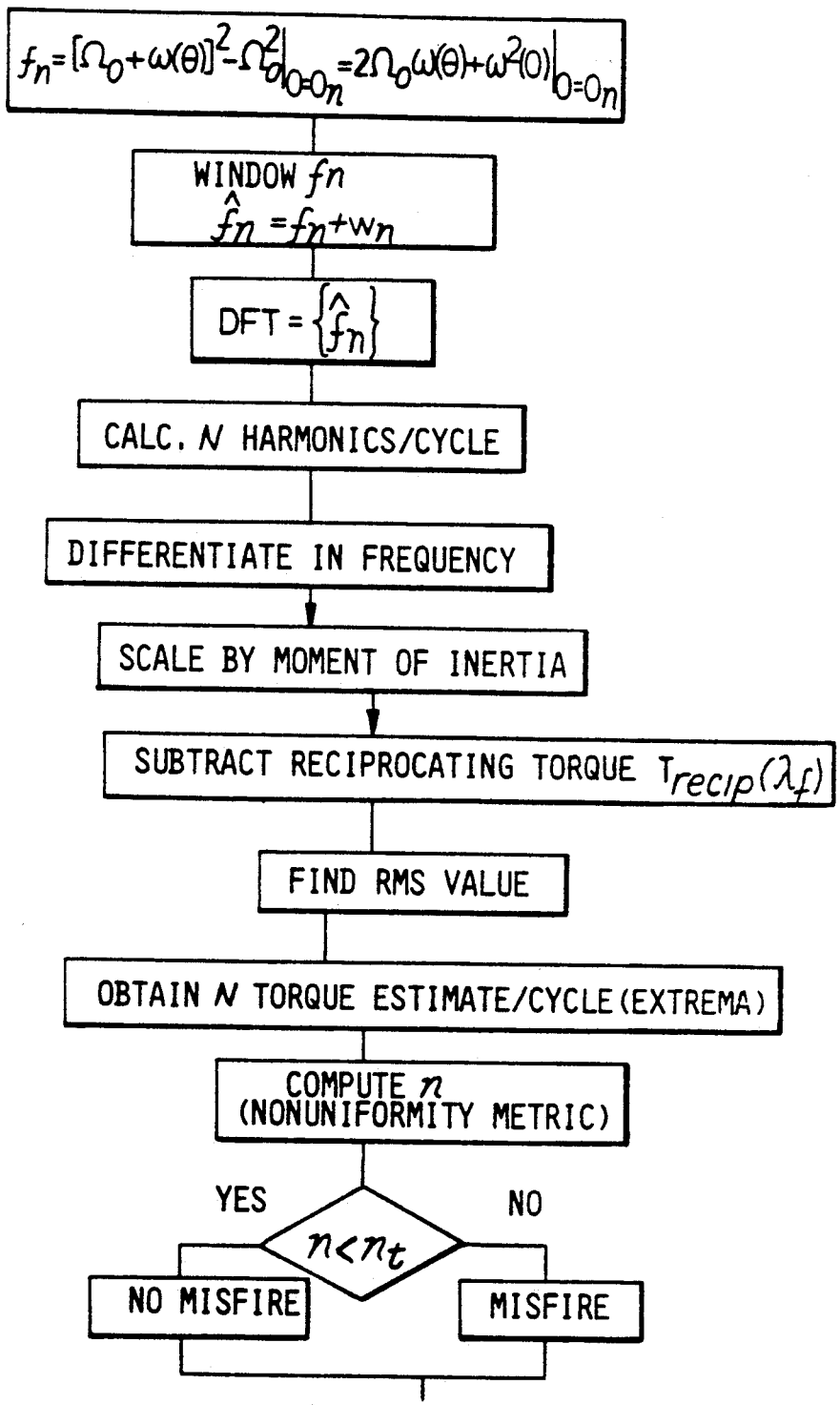
FIG. 9 is a block diagram flow chart of the improved method of the present invention.

An improvement in the misfire detection method and apparatus described in the present section is illustrated in FIG. 9 and as follows. In the previously described method, the instantaneous indicated torque is estimated in the frequency domain based upon measurements of the sampled crankshaft instantaneous angular velocity, $$\omega(\theta_n) = \overline{\omega} + \omega_{ac}(\theta_n)$$

where $\overline{\omega}$ is the average angular velocity (RPM), and $\omega_{ac}(\theta_n)$ is the deviation from w of the instantaneous angular velocity due to the cylinder firing events. As illustrated above, the frequency domain method involves calculating a frequency domain transformation of the engine angular velocity signal, for example:

$$\Omega(\lambda) = F\{\overline{\omega} + \omega_{ac}(\theta_n)\} = DFT\{\overline{\omega} + \omega_{ac}(\theta_n)\} \text{ at } \lambda = \lambda_f$$

In the present invention, the angular speed is modified as follows:

$$\omega'(\theta_n) = \{[\overline{\omega} + \omega_{ac}(\theta_n)]^2 - \overline{\omega}^2 = 2\overline{\omega}\omega_{ac}(\theta_n) + \omega_{ac}^2(\theta_n)$$

then a window, $w(\theta_n)$, is applied to the modified angular speed sequence, to obtain a windowed angular speed sequence, $\hat{\omega}'(\theta_n)$ such that $$\hat{\omega}'(\theta_n) = \omega'(\theta_n) w(\theta_n)$$

where $w(\theta_n)$ is a window function of choice. The choice of window function is done using well known digital signal processing criteria, and with respect to the window giving optimum performance at misfire detection. Many choices for window functions are available including Hamming, Hanning, triangular, etc.

The frequency domain transformation of the window function is then computed, for example:

$$\Omega'(\lambda) = F[\hat{\omega}'(\theta_n)] = DFT[\hat{\omega}'(\theta_n)] \text{ at } \lambda = \lambda_f$$

and the M-dimensional torque nonuniformity vector is then computed as described above.

Still another improvement in the frequency domain method is possible by obtaining a sampled engine angular velocity signal with the average engine angular velocity removed:

$$\omega''(\theta_n) = \omega_{ac}^2(\theta_n).$$

Then as described above, this input data is windowed, yielding:

$$\hat{\omega}''(\theta_n) = \omega''(\theta_n) w(\theta_n).$$

Misfire Detection

If the torque produced by the engine during a given cycle were absolutely uniform, then n would be a M-dimensional null vector. In reality n is never a null vector owing to cyclic variability of combustion and to misfire, if present. A metric n is computed for representing torque nonuniformity and for detecting misfire, which is called the torque nonuniformity index or metric. This metric is computed by evaluating the norm of a vector which indicates the deviation from ideal engine performance caused by any nonuniformity in the generation of torque.

Any $L_p$ norm is adequate for the purpose of detecting the presence of a misfire; the two most common choices are:

$$n = \|n\|1 \quad L_1 \text{ norm}$$
$$n = \|n\|2 \quad L_2 \text{ norm}$$

Although either norm of n will suffice for misfire detection, the $L_1$ norm is normally preferred because it is more efficiently computed (it does not require square and square-root operations and can be computed in integer arithmetic format, facilitating the onboard computation and misfire detection).

Figure 8:
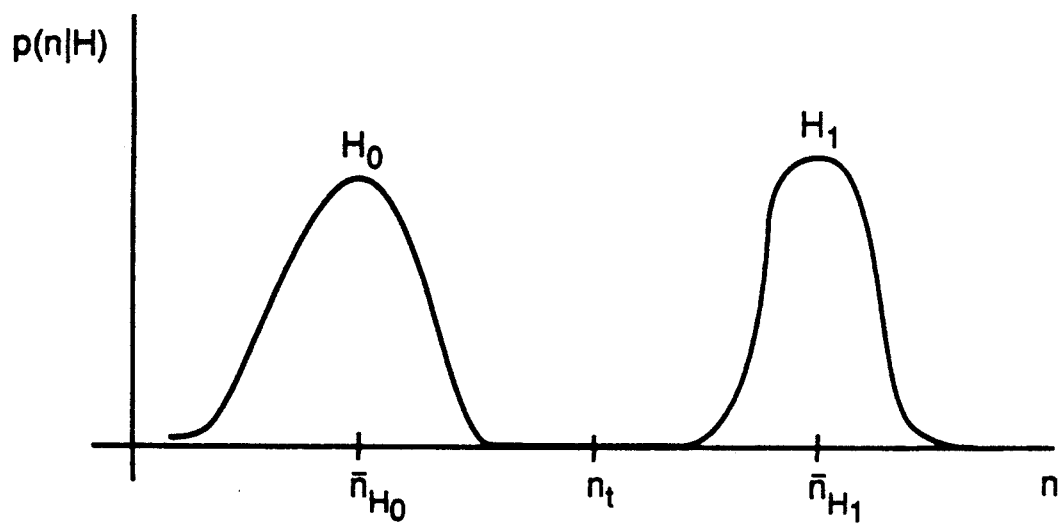
FIG. 8 is a graph of the probability density function for the random variable N under normal engine operation and misfire in one cylinder.

Detection of misfire is done on a statistical hypothesis testing basis. FIG. 8 is a graph of the probability density function for the random variable n under the two hypotheses.

$H_0$: normal engine operation
$H_1$: misfire in one cylinder (not necessarily the same for each cycle).

The left distribution in FIG. 8 represents the statistics of the random fluctuations in random variable n for normal engine operation. This distribution results from normal cyclic variability in combustion. The distribution on the right corresponds to the statistics in the event of one misfire in each engine cycle. The distribution is the same regardless of which cylinder misfires. The cylinder number of the single misfiring can be randomly changing from cycle to cycle.

The detection of misfire can be based on a variety of criteria according to statistical decision theory. One particularly simple test can be applied to the nonuniformity index n for each engine cycle by selecting a threshold $n_t$ midway between the mean values $\bar{n}_{H0}$ for normal operation and $\bar{n}_{H1}$ or misfire.

i.e., $$n_t = \frac{n_{H1} + n_{H0}}{2}$$

This particular choice of thresholds corresponds to assigning equal costs to false alarms and missed detections.

The following criterion for misfire detection is applied in the present embodiment.

$n > n_t \rightarrow$ misfire $n < n_t \rightarrow$ normal operation.

There are two types of errors made by such a method:
1. $n < n_t$ for a misfiring cycle
2. $n > n_t$ for a normal cycle.

The probability for such errors is:

$$p_e = \int_{n_t}^{\infty} p_{H0}(n)\, dn + \int_{0}^{n_t} p_{H1}(n)\, dn$$

From actual experimental data, the error rate for a typical engine is less than 0.5%. The confidence level for errors at this rate is greater than 99%.

The computation of the nonuniformity metric described above is utilized to detect the occurrence of a misfiring condition. Once such a condition is detected, the problem becomes that of isolating the faulty cylinder(s).

Each misfire pattern is characterized by a specific vector $n^k$ where the index k corresponds to the type of misfiring pattern. For example, k=0 might correspond to the condition "no misfire", k=1 to "misfire in cylinder No. 1", k=3,1 to "misfire in cylinders 3 and 1". Thus, each misfire condition is characterized by a unique vector signature. FIGS. 5A through 5D illustrate a few typical misfiring signatures or waveforms for single and double cylinder misfires in a V-6 engine where misfire occurs in cylinder(s) n; n, n+1; n, n+2; and n, n+3, respectively. The figures correspond to actual engine data. The algorithm described above converts the sampled velocity waveforms shown in FIGS. 5A through 5D into 2N-vectors of extrema.

Each of the vectors $n^k$ generates a point in 2N-dimensional euclidean space. As many points as misfire conditions can be represented in this space. The pattern recognition problem consists of determining the point which the observed vector of extrema is closest to (based on a normal metric), given the known misfire pattern. The distance between the observation and each of the points in 2N space is represented by the shortest vector, according to the principle of orthogonal projections. Let this distance, $\delta$, be defined as follows, in vector form:

$$\delta^k = n^k - n$$

where n is the observed vector of extrema corresponding to a specific engine cycle. Then the problem of isolating the misfiring cylinder is reduced to computing a norm of $\delta^k$ (any $L_p$ norm will suffice), and finding the minimum value: $\min\{|\delta^k|\}$. This minimum indicates the "nearest neighbor", and therefore isolates the cylinder(s) which are the most probable cause of misfire. Experiments performed on production vehicles have verified that if this nearest neighbor classification is executed on the basis of a single cycle of engine velocity data, the correct classification is made with an error rate of three incorrect classifications in one thousand cycles. If the average of two consecutive cycles is computed, our experiments indicated zero errors over a sample space of 5,000 cycles.

Indicated Torque Of Each Cylinder

The indicated torque of each cylinder is characterized by the combustion process after the ignition, and an important part of the process happens in the early stage of the expansion stroke of each cylinder. In other words, one engine cycle is divided by the number of cylinders from the beginning of the engine cycle, i.e. the top dead center (TDC) of the number 1 cylinder, and that in each division phenomena due mainly to each cylinders combustion occurs. The method to estimate each cylinder's indicated torque is based on this idea. That is, if a Discrete Fourier Transform (DFT) is applied to the indicated torque in each division, the first harmonic of the indicated torque in each division represents the combustion in each cylinder. These magnitudes represent only the AC component of the indicated torque due to each combustion, but due to the relationship between the AC component and the DC component of the indicated torque, the DC component will be also estimated.

To identify misfiring cylinders, take the 2N dimensional vector of engine speed variation that includes N minima and N maxima, where N represents numbers of cylinders, and take the amplitude of each pair of minimum and maximum. Each amplitude represents the indicated torque of respective cylinder. The combination of this method and Well designed analog band-pass filters (which eliminate other frequency components of no interest and make the extreme clearer) can reduce computation load on a microprocessor. A feature of the method is that the method has robustness against noise that has not been attenuated by analog filters. In spite of extrema more than double the number of cylinders, the magnitude of indicated torque of each cylinder processed by this method is not affected by noise.

Misfire Detection

From the proceeding description of the means for computing the torque nonuniformity vector T obtained according to either time domain or frequency domain method, an improved means of misfire detection is possible with respect to rapid acceleration or deceleration or with respect to intermittent misfire. These improvements are of the form of comparing the torque in a cylinder during a given engine cycle with weighted averages of the torque for that cylinder for previous cycles or for the weighted averages of N previous cylinders.

In the third misfire detection path of FIG. 1, a reference magnitude or value for the indicated torque is computed from the torque nonuniformity vector as described hereinbelow. Two reference magnitudes are computed depending upon operating conditions as explained below.

Figure 10:
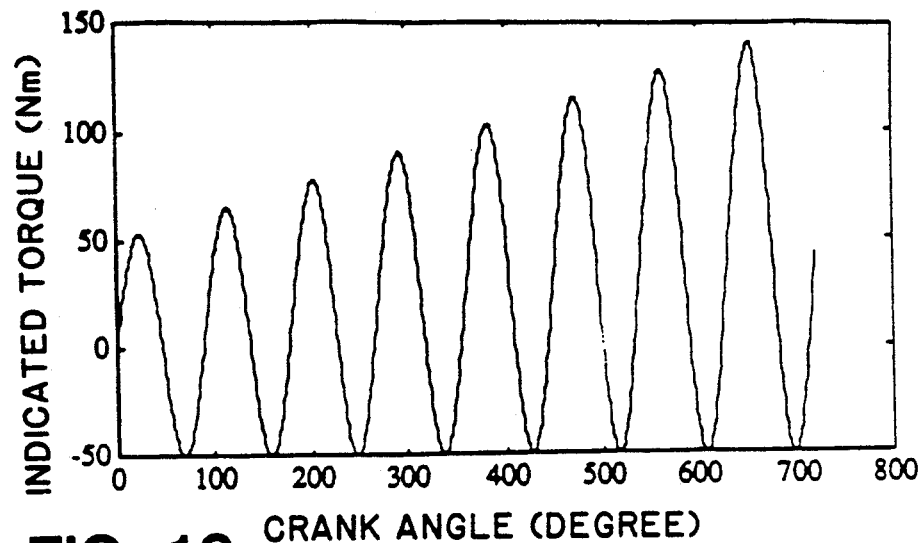
FIG. 10 is a graph of indicated torque waveform in acceleration.
Figure 11:
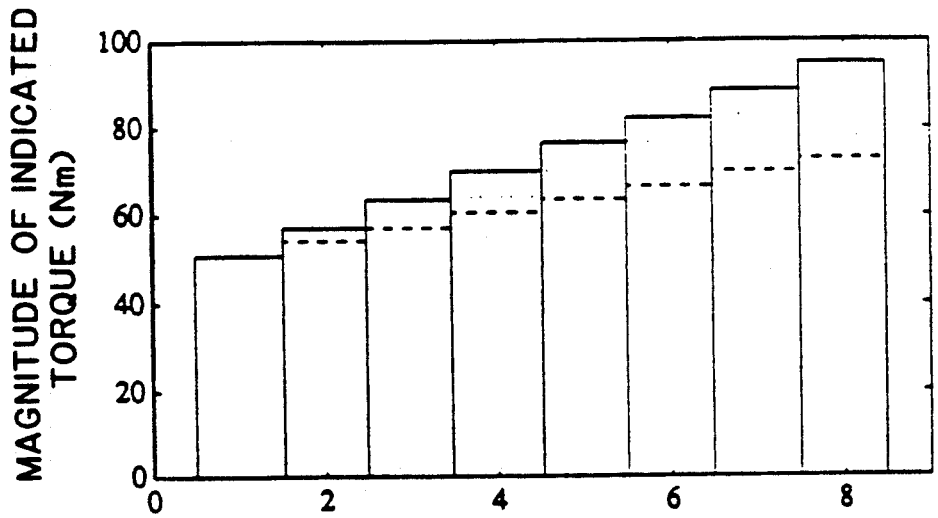
FIG. 11 is a graph of indicated torque in each cylinder in acceleration and two kinds of averages, (i.e. processing the waveform in FIG. 10)

For misfire detection in transient conditions, a weighted average is preferable to a simple arithmetic average in respect to having a value closer to the magnitude of the indicated torque due to the previous combustion. FIG. 10 shows indicated torque with increasing magnitude, which is assumed to be acceleration. FIG. 11 shows the magnitude of the indicated torque of each cylinder. The dashed line represents the arithmetic average from the number 1 to the number 8 cylinder and the dotted line represents the weighted average for the same cylinders. These averages are given by:

$$T_N = \sum_{k=1}^{N} a_k |T_k| \qquad (a)$$

where $T_N$ = average of indicated torque for previous N cylinders;

$|T_k|$ = magnitude of indicated torque of the k-th cylinder;

$a_k$ = weight for $|T_k|$; with $$a_k = \frac{1}{N} = \text{for the arithmetic average; and} \qquad (b)$$

$$a_k = \frac{1}{2^{N-k+1}} = \text{for the weighted average} \qquad (c)$$

The weighted average indicates closer value to the magnitude of the number 8 cylinder (the previous combustion occurred there) than the arithmetic average. The arrangement of weights can be selected in various ways according to the acceleration and deceleration characteristics of the engine or particular purposes. For example, if faster acceleration is to be followed, heavier weight for the previous cylinder may be used and if there is a need to neglect the fluctuation between each cylinder, an almost uniform weight may be used.

In this improved misfire detection method, two kinds of averages of the indicated torque magnitude are used. One is the average of some previous cylinders and the other is the average of some previous engine cycles for each cylinder. The former one is used as the index of normal combustion to detect a misfiring cylinder and the latter one is necessary to distinguish an intermittent misfire from a continuous misfire with the combination of the former one.

For convenience, the former one is called "all cylinder average" and the latter one "each cylinder average." The weighted average method is used to calculate the "all cylinder average" and the "each cylinder average."

The "all cylinder average" for previous N cylinders can be calculated by equations (a) and (c). The "each cylinder average" of the number j cylinder for the previous L engine cycles is given by:

$$T_L(j) = \sum_{k=1}^{L} a_k |T_k(j)| \qquad (d)$$

where $T_L(j)$ = "each cylinder average" of the number j cylinder for the previous L cycles;

$|T_k(j)|$ = magnitude of indicated torque of the number j cylinder in the k-th cycle; and $$a_k = \frac{1}{2^{L-k+1}} = \text{weight for } |T_k(j)| \qquad (e)$$

For demonstrating via simulation how to use the two kinds of averages of the indicated torque to distinguish an intermittent misfire from a continuous misfire, the magnitude of the indicated torque for two engine cycles of an 8 cylinder engine are prepared where one misfire is included in cylinder number 8 in the second cycle. Some fluctuations are set in the magnitude of each cylinder, cylinder by cylinder, and it is assumed for simplicity that the magnitude of each cylinder is uniform before the first cycle.

Figure 12:
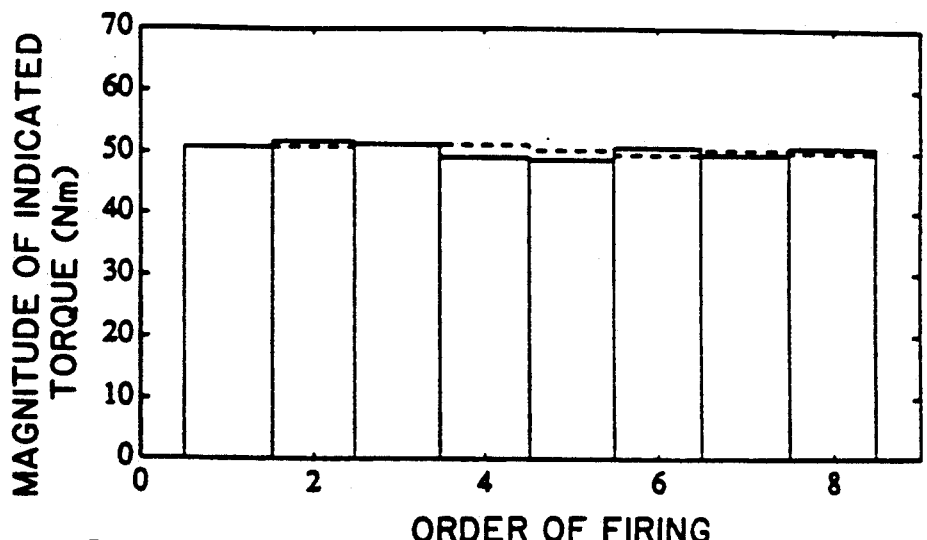
FIG. 12 is a graph of the magnitude of indicated torque and all cylinder average (in the first cycle)

In FIG. 12, the solid line represents the magnitude of the indicated torque of each cylinder in the first cycle and the dashed line represents the "all cylinder average" which began from the cylinder number 1 in the first cycle and continues in the second cycle. The difference between the magnitude of each cylinder torque and the "all cylinder average" torque is very small, and therefore we judge that no misfire occurred.

Figure 13:
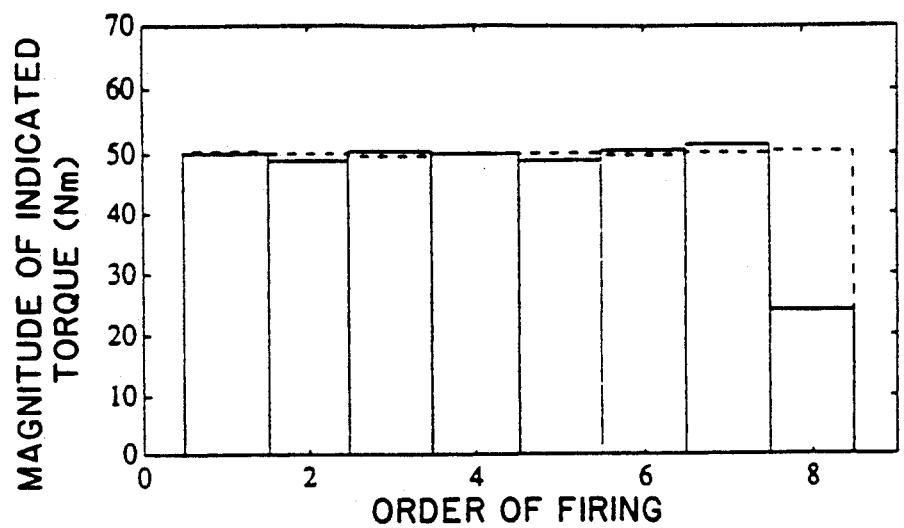
FIG. 13 is a graph of the magnitude of indicated torque and all cylinder average with an intermittent misfire in #8 (in the second cycle)
Figure 14:
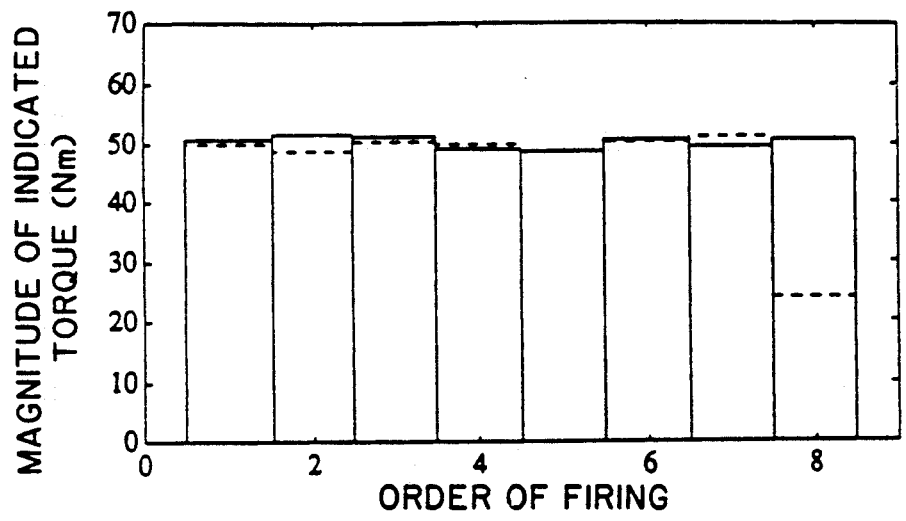
FIG. 14 is a graph of the magnitude of indicated torque in the second cycle and each cylinder average until the first cycle with an intermittent misfire in #8.

FIG. 13 shows the magnitude of the indicated torque of "each cylinder" and the "all cylinder average" in the second cycle. A misfire in cylinder number 8 can be detected because the magnitude of number 8 cylinder becomes small compared to the "all cylinder average." To judge if a misfire occurs or not, threshold values are set, but the values of the thresholds are strongly dependent on the purpose of each application and is readily determined in the specific design for the system.

Figure 15:
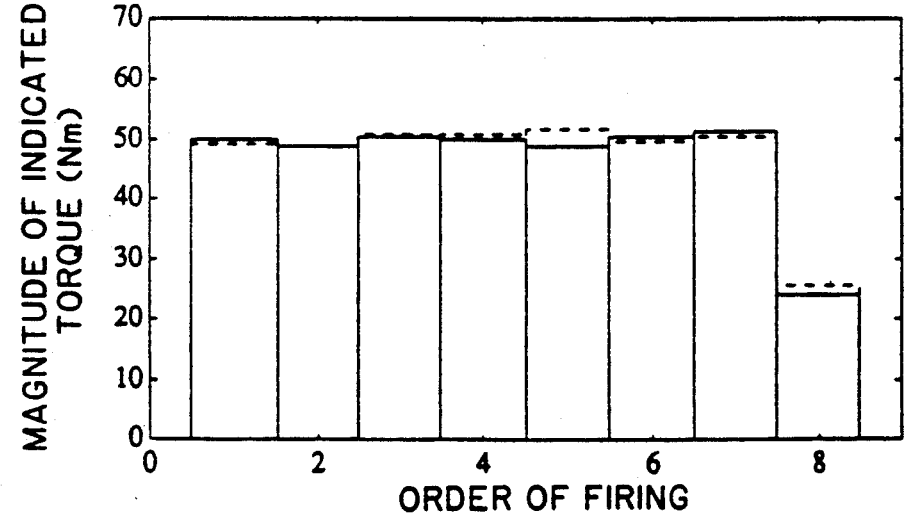
FIG. 15 is a graph of the magnitude of indicated torque and each cylinder average with a continuous misfire in #8.

FIG. 15 shows the magnitude of the indicated torque in the second cycle and the each cylinder average until the first cycle. The difference of the two lines in cylinder number 8 is also big. It means that until the second cycle there is no misfire in number 8 and an intermittent misfire occurs in the cylinder in the second cycle. If the misfire in cylinder number 8 continues, the difference between the two lines in the cylinder will become small and the intermittent misfire changes to continuous misfire as shown in FIG. 15.

The improved method and system performs misfire detection either for continuous or intermittent misfire whether the engine operation is steady or accelerating or decelerating.

The invention has been described in an illustrative manner and, it is to be understood that, the terminology which has been used is intended to be in the nature of words of description rather than of limitation.

Obviously, many modifications and variations of the present invention are possible in light of the above teachings. It is, therefore, to be understood that, within the scope of the appended claims, the invention may be practiced otherwise than as specifically described.

We claim:

1. A method for detecting a misfire of a reciprocating internal combustion engine having a plurality of reciprocating components, at least one cylinder and a crankshaft, the method comprising the steps of:

measuring angular velocity of said crankshaft to obtain an electrical signal representation thereof, said electrical signal containing data;

filtering said data to minimize the effects of random error and disturbances in said electrical signal to obtain filtered data;

calculating an M-dimensional torque nonuniformity vector derived from said filtered data;

computing at least one reference value of torque based on said torque nonuniformity vector;

estimating indicated torque provided by said at least one cylinder during a given engine cycle based upon said crankshaft angular velocity; and comparing said at least one reference value with said indicated torque to obtain a misfire signal.

2. The method of claim 1 wherein the step of estimating includes the steps of applying a discrete Fourier transforms to an electrical signal representation of the angular velocity to obtain a first harmonic of the indicated torque which represents the combustion in the at least one cylinder at a cylinder firing frequency.

3. The method of claim 1 wherein the step of computing the at least one reference value includes the step of computing a weighted average of the torque of the at least one cylinder.

4. The method of claim 1 or claim 3 wherein the step of computing the at least one reference value includes the step of computing an arithmetic average of the torque of the at least one cylinder.

5. The method of claim 1 wherein the internal combustion engine has a plurality of cylinders and wherein the step of computing the at least one reference value includes the step of computing a weighted average of the torque for the plurality of cylinders.

6. The method of claim I or claim 5 wherein the internal combustion engine has a plurality of cylinders and wherein the step of computing the at least one reference value includes the step of computing the arithmetic average of the torque for the plurality of cylinders.

7. The method as claimed in claim 1 wherein the step of calculating the M-dimensional torque nonuniformity vector includes the step of estimating indicated torque provided by the at least one cylinder based upon the crankshaft angular velocity in which the appropriate engine dynamics including reciprocating inertia forces are taken into account to obtain an indicated torque signal.

8. The method as claimed in claim 1 further comprising the steps of sampling the data synchronously with crankshaft angular position at a sampling rate to obtain sampled data; and windowing the sampled data to obtain windowed data and wherein the torque nonuniformity vector is derived from the windowed and filtered data and wherein the step of calculating includes the step of transforming the windowed and filtered data to a frequency domain equivalent.

9. A system for detecting a misfire of a reciprocating internal combustion engine having a plurality of reciprocating components, at least one cylinder and a crankshaft, the system comprising:

means for measuring angular velocity of said crankshaft to obtain an electrical signal representation thereof, said electrical signal containing data;

means for filtering the data to minimize the effects of random error and disturbances in said electrical signal to obtain filtered data;

means for calculating an M-dimensional torque nonuniformity vector derived from said filtered data;

means for computing at least one reference value of torque based on said torque nonuniformity vector;

means for estimating indicated torque provided by said at least one cylinder during a given engine cycle based upon said crankshaft angular velocity; and means for comparing said at least one reference value with said indicated torque to obtain a misfire signal.

10. The system of claim 9 wherein the means for estimating includes means for applying a discrete Fourier transform to an electrical signal representation of the angular velocity.

11. The system of claim 9 wherein the means for computing the at least one reference value includes means for computing a weighted average of the torque of the at least one cylinder.

12. The system of claim 9 or claim 11 wherein the means for computing the at least one reference value includes means for computing an arithmetic average of the torque of the at least one cylinder.

13. The system of claim 9 wherein the internal combustion engine has a plurality of cylinders and wherein the means for computing the at least one reference value includes means for computing a weighted average of the torque for the plurality of cylinders.

14. The system of claim 9 or claim 13 wherein the internal combustion engine has a plurality of cylinders and wherein the means for computing the at least one reference value includes means for computing the arithmetic average of the torque for the plurality of cylinders.

15. The system as claimed in claim 9 wherein the means for calculating the M-dimensional torque nonuniformity vector includes means for estimating indicated torque provided by the at least one cylinder based upon the crankshaft angular velocity in which the appropriate engine dynamics including reciprocating inertia forces are taken into account to obtain an indicated torque signal.

16. The system as claimed in claim 9 further comprising means for sampling the data synchronously with crankshaft angular position at a sampling rate to obtain sampled data; and means for windowing the sampled data to obtain windowed data and wherein the torque nonuniformity vector is derived from the windowed and filtered data and wherein the means for calculating includes means for transforming the windowed and filtered data to a frequency domain equivalent.

17. The system as claimed in claim 9 wherein the means for filtering includes an analogue filter.

* * * * *

UNITED STATES PATENT AND TRADEMARK OFFICE
CERTIFICATE OF CORRECTION

PATENT NO. : 5,278,760

DATED : January 11, 1994

INVENTOR(S) : William B. Ribbens et al.

It is certified that error appears in the above-identified patent and that said Letters Patent is hereby corrected as shown below:

Column 2, line 54
after "$(\Delta\theta=\theta_i-$" replace "$\theta_{i-1})$." with -- $\theta_{i-1}$ --;

Column 8, line 26
after "$\omega(\theta)$" insert -- . -- (period) and replace "once" with -- Once --;

Column 8, lines 48-50
in the equation, replace "$\omega$" with --$\hat{\omega}$-- (two occurrences);

Column 8, line 52
after "throw," replace "$\omega$" with --$\hat{\omega}$--;

Column 8, line 67
after "component" replace "$\epsilon_w(\theta)$" with --$\epsilon_\omega(\theta)$--;

Column 10, line 20
the equation, after "$F\{\omega(\theta_n)$" replace "$]56 = \Omega(\lambda)$" with --$\} = \Omega(\lambda)$--;

Column 10, line 64
after "torque" replace "f or" with --for--;

Column 11, line 60
after "from" replace "w" with --$\hat{\omega}$--;

Column 12, line 38
after "then," replace "n" with --$\underline{n}$--;

Column 12, line 39
after "reality", replace "n" with --$\underline{n}$--;

UNITED STATES PATENT AND TRADEMARK OFFICE
CERTIFICATE OF CORRECTION

PATENT NO. : 5,278,760

DATED : January 11, 1994

INVENTOR(S) : William B. Ribbens et al.

It is certified that error appears in the above-identified patent and that said Letters Patent is hereby corrected as shown below:

Column 12, lines 52-54
in both equations, inside the double lines, replace "n" with --$\underline{n}$--;

Column 12, line 55
after "norm of", replace "n" with --$\underline{n}$--;

Column 13, lines 16-18
23-25) in the equation, after "$n_t$=", in the numerator, replace "$n_{H1} + n_{HO}$" with --$\bar{n}_{H_1} + \bar{n}_{H_0}$ --;

Column 13, line 49
after "vector", replace "$n^k$" with --$\underline{n}^k$--;

Column 13, line 62
after "vectors" replace "$n^k$" with --$\underline{n}^k$--;

Column 14, line 4
after "where" replace "$\delta^k = n^k - n$" with --$\underline{\delta}^k = \underline{n}^k - \underline{n}$--;

Column 14, line 7
after "where" replace "n" with --$\underline{n}$--;

Column 14, line 11
after "min{" replace "/ $\underline{\delta}^k$/ " with --// $\underline{\delta}^k$ //--;

Column 14, line 49
after "method and" replace "Well" with --well--; and

UNITED STATES PATENT AND TRADEMARK OFFICE
CERTIFICATE OF CORRECTION

PATENT NO.  : 5,278,760
DATED       : January 11, 1994
INVENTOR(S) : William B. Ribbens et al It is certified that error appears in the above-indentified patent and that said Letters Patent is hereby corrected as shown below:

Column 17, line 20, after "fourier" replace "transforms" with --transform--.

Signed and Sealed this

Nineteenth Day of July, 1994

Attest:

BRUCE LEHMAN

Attesting Officer

Commissioner of Patents and Trademarks